United States Patent [19]

Peyton

[11] Patent Number: 4,512,456

[45] Date of Patent: Apr. 23, 1985

[54] FORCE BALANCED ACTUATOR FOR MECHANICALLY ACTUATED CONTAINER GRIPPERS

[75] Inventor: John J. Peyton, Santa Barbara, Calif.

[73] Assignee: Industrial Automation Corp., Goleta, Calif.

[21] Appl. No.: 428,145

[22] Filed: Sep. 29, 1982

[51] Int. Cl.³ .............................................. B65G 47/86
[52] U.S. Cl. ..................................... 198/479; 198/696
[58] Field of Search ............... 198/370, 441, 480, 481, 198/653, 696, 479

[56] References Cited

U.S. PATENT DOCUMENTS 2,371,748  3/1945  Fedorchak ...................... 198/653 X
3,975,260  8/1976  Peyton et al. ................... 198/441 X Primary Examiner—Joseph E. Valenza
Assistant Examiner—Stuart J. Millman
Attorney, Agent, or Firm—Blakely, Sokoloff, Taylor & Zafman

[57] ABSTRACT

Force balanced actuator for mechanically actuated container grippers such as may be used in bottle handling apparatus are disclosed. The actuator is disposed so as to cooperatively engage an actuating member of a gripper assembly moving with respect thereto. The actuator is supported so as to yield in response to engagement with the actuating member of a gripper assembly and to engage a second member mounted on the same structure as the gripper assembly so that the actuation force required by the gripper assembly is provided, not by the structure supporting the actuator, but by the second member supported on the same structure as the gripper assembly. In this manner noise, vibration and structural rigidity requirements of such equipment are substantially reduced.

10 Claims, 7 Drawing Figures

FORCE BALANCED ACTUATOR FOR MECHANICALLY ACTUATED CONTAINER GRIPPERS

BACKGROUND OF THE INVENTION

1. Field of the Invention

The present invention relates to the field of container handling apparatus and more particularly, to container handling apparatus utilizing one or more mechanically actuated grippers.

2. Prior Art

In container handling equipment such as bottle handling equipment, various types of grippers are used to hold, transport, uncase, etc., bottles and other types of containers. Some of this equipment utilizes mechanical grippers for container gripping purposes, as mechanical grippers tend to be simpler, more reliable and more readily designed into such equipment because of the lack of separate power requirements, pressure lines, vacuum lines, etc., characteristic of other types of grippers. Mechanical grippers generally are characterized as comprising some form of gripper assembly carried on a moving structure with each gripper having an actuating member appropriately disposed for either intercepting a stationary actuator member for the actuation thereof, or at least intercepting a member moving with respect thereto so that the force between the gripper assembly actuating member and the cooperatively disposed member is appropriate to actuate the gripper assembly as desired. Typically, the gripper assemblies are supported on one or more moving structures whereas the cooperatively disposed members for engaging the gripper actuating members are supported on a separate structure.

The preferred embodiment of the present invention is intended for use with the bottle handling apparatus of U.S. Pat. No. 3,975,260, which apparatus is representative of the types of apparatus with which the present invention would be utilized. That patent discloses what is more commonly referred to as an electronic bottle inspector wherein bottles delivered on an inlet conveyor are engaged by mechanical grippers mounted on a starwheel assembly and carried past an inspection head which analyzes the image of the bottom of the bottle to determine whether the bottle contains foreign matter. If the bottle does not contain foreign matter, the respective gripper is released at a first position in the starwheel assembly rotation so as to be picked up by an outlet conveyor, whereas if the bottle does contain contamination or is otherwise rejected, the bottle is released at a second position in the starwheel rotation so that the rejected bottles may accumulate on a reject table or be delivered to a reject conveyor. Obviously from this description, each mechanical gripper must be actuated to receive a bottle at the pickup point, with most of the grippers being opened to release the bottles at the outlet conveyor, as the percentage of bottles which are rejected in the normal course is relatively low.

In the apparatus of U.S. Pat. No. 3,975,260, the starwheel assembly is supported on a vertical shaft, bearing mounted in a lower housing or chassis, with the inspection head being separately mounted on the chassis so as to be stationarily and cooperatively disposed with respect to the starwheel assembly for inspecting bottles carried by the starwheel thereby. The gripper assemblies are closed at the bottle pickup point by a cam mounted to the inspection head structure, with the grippers being opened by another cooperatively disposed cam, also mounted to the inspection head assembly. At low to moderate operating speeds, the system operates very smoothly, and even at high speed functions properly and without difficulty. However, at the higher speeds, the system does not operate as quietly as one might desire, and vibration may be encountered as a result of the inspection head assembly and/or starwheel assembly vibrating on their less than perfectly rigid support structure. The problem, of course, is not made any easier by the fact that this type of equipment generally must operate at a speed determined by the rest of the system in which it is used rather than at a speed to be determined by the manufacturer of the electronic bottle inspector itself and at certain speeds the repetitive cam force may tend to excite one or more resonances in the system to generate the distracting noise and vibration.

BRIEF SUMMARY OF THE INVENTION

Force balanced actuator for mechanically actuated container grippers such as may be used in bottle handling apparatus are disclosed. The actuator is disposed so as to cooperatively engage an actuating member of a gripper assembly moving with respect thereto. The actuator is supported so as to yield in response to engagement with the actuating member of a gripper assembly and to engage a second member mounted on the same structure as the gripper assembly so that the actuation force required by the gripper assembly is provided, not by the structure supporting the actuator, but by the second member supported on the same structure as the gripper assembly. In this manner noise, vibration and structural rigidity requirements of such equipment are substantially reduced.

DETAILED DESCRIPTION OF THE INVENTION

Figure 1:
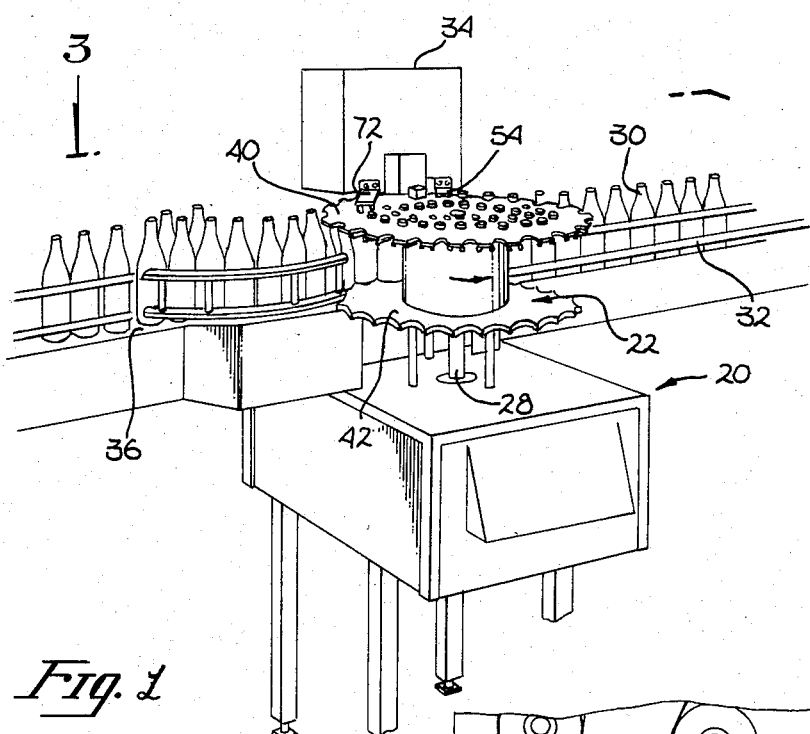
FIG. 1 is a perspective view of a typical electronic bottle inspector incorporating the present invention.

First referring to FIG. 1, a perspective view of an electronic bottle inspector generally indicated by the numeral 20 may be seen. Most of the functional aspects of this inspector, except for those special aspects to be subsequently described in detail herein, are in accordance with U.S. Pat. No. 3,975,260. In particular, a starwheel assembly, generally indicated by the numeral 22, comprising an upper starwheel 40 and a lower starwheel 42, all supported on the shaft 28, receives bottles 30 on an inlet conveyor 32, moves the bottles under the inspection head 34 and then delivers the bottles to an outlet conveyor 36 or to a rejected bottle accumulation table.

Figure 2:
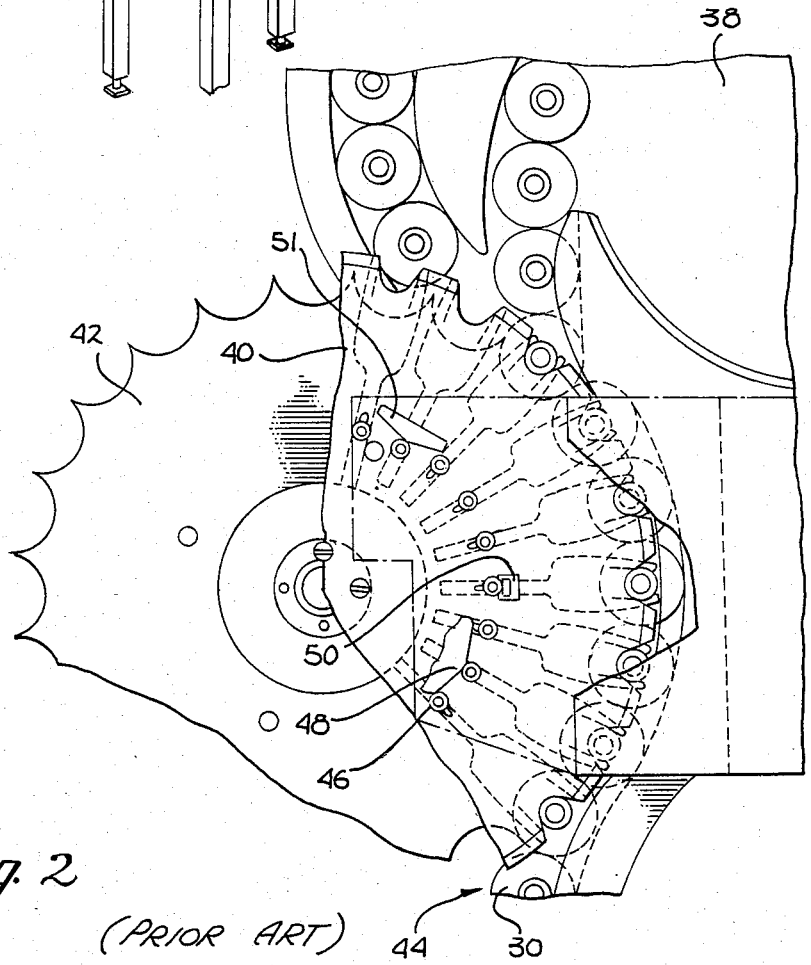
FIG. 2 is a top view, partially cut away, of a starwheel assembly and associated structure of a prior art electronic bottle inspector.

FIG. 2 is a top view of a typical starwheel assembly in accordance with the prior art, the upper starwheel 40 being cut away to show the lower starwheel 42 to illustrate the cooperation of the bottles therewith. Bottles 30 received by the starwheel in region 44 are pocketed in the upper and lower starwheels, with individual mechanical gripper assemblies gripping the bottles around the necks thereof just below the upper starwheel pockets. Each gripper assembly is actuated by a roller 46 projecting above the top of the upper starwheel 40 to engage a cam 48 supported by and just under the inspection head 34 of FIG. 1. Cam 48 forces the rollers 46 radially outward, causing the mechanical gripping of the bottles and the toggling of each gripper assembly to an over center gripping condition. Accordingly, assuming each pocket is occupied by a bottle, each gripper will remain in the over center gripping condition unless a solenoid assembly, generally indicated by the numeral 50, is actuated to kick the respective roller 46 to the gripper unactuated (i.e., not gripping) condition in response to the detection of foreign matter in the bottle by the inspection head. In such an instance, the bottles will take the first exit from the starwheel assembly to be accumulated on the rejected bottle table 38. Otherwise, as is the case with most bottles passing throught the electronic bottle inspector, the grippers will remain actuated until the rollers 46 contact release cam 51, which engages the rollers 46 and forces them back through center to the gripper released position. Further details of the over center toggle condition of the grippers, the actuation of the grippers to the gripping condition and the release thereof may be found in U.S. Pat. No. 3,975,260. It is the periodic and repetitive force of rollers 46 against cam 48 and against cam 51 which at some higher operating speeds creates undesired vibration and noise in the system. The snapping of the grippers to the gripper open condition, as initiated by cam 51 engaging rollers 46 on the grippers, is also believed to contribute to the vibration and more particularly, to the noise characteristic of the system.

Figure 3:
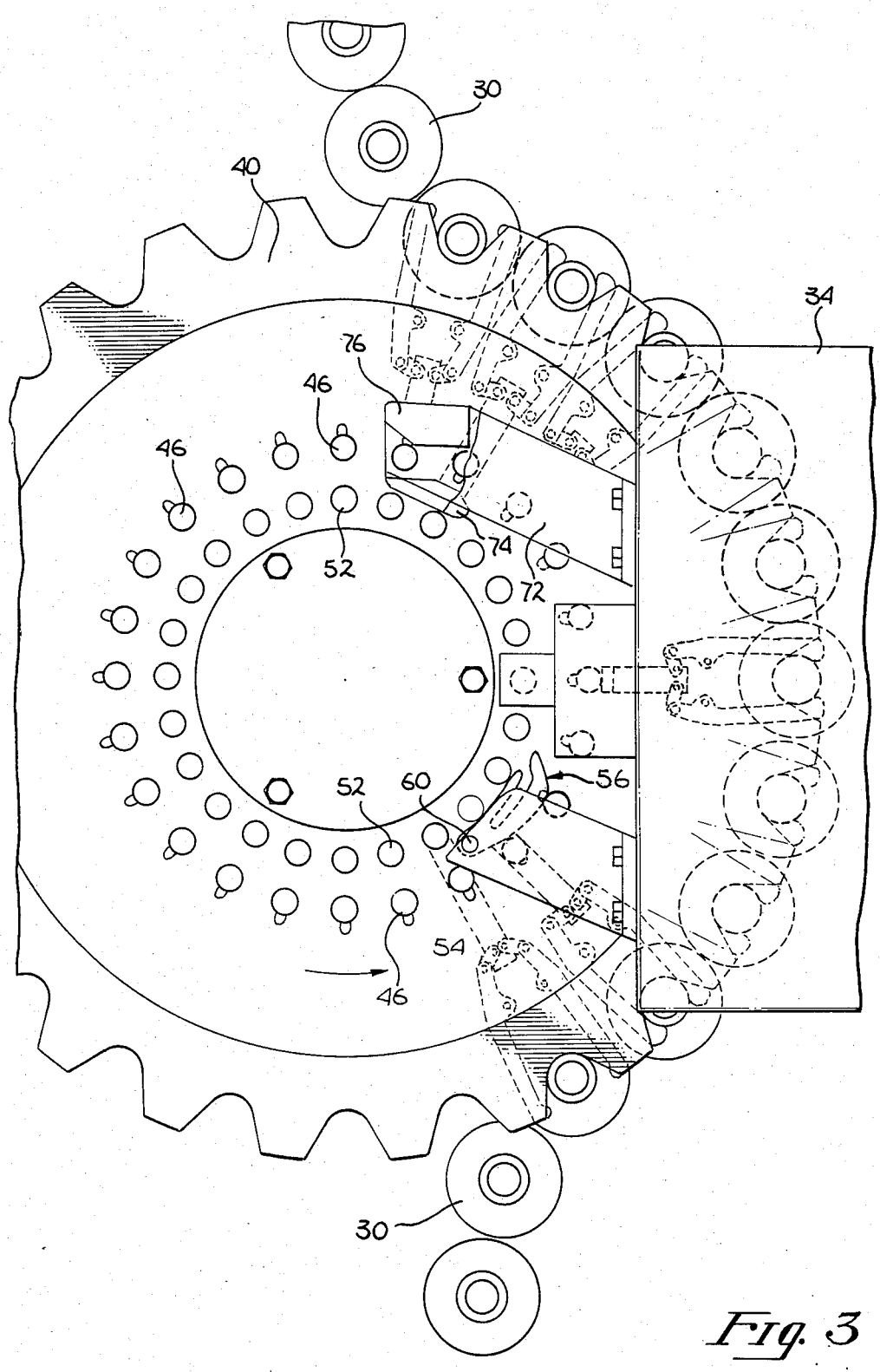
FIG. 3 is a view illustrating the present invention taken along line 3—3 of FIG. 1.
Figure 4:
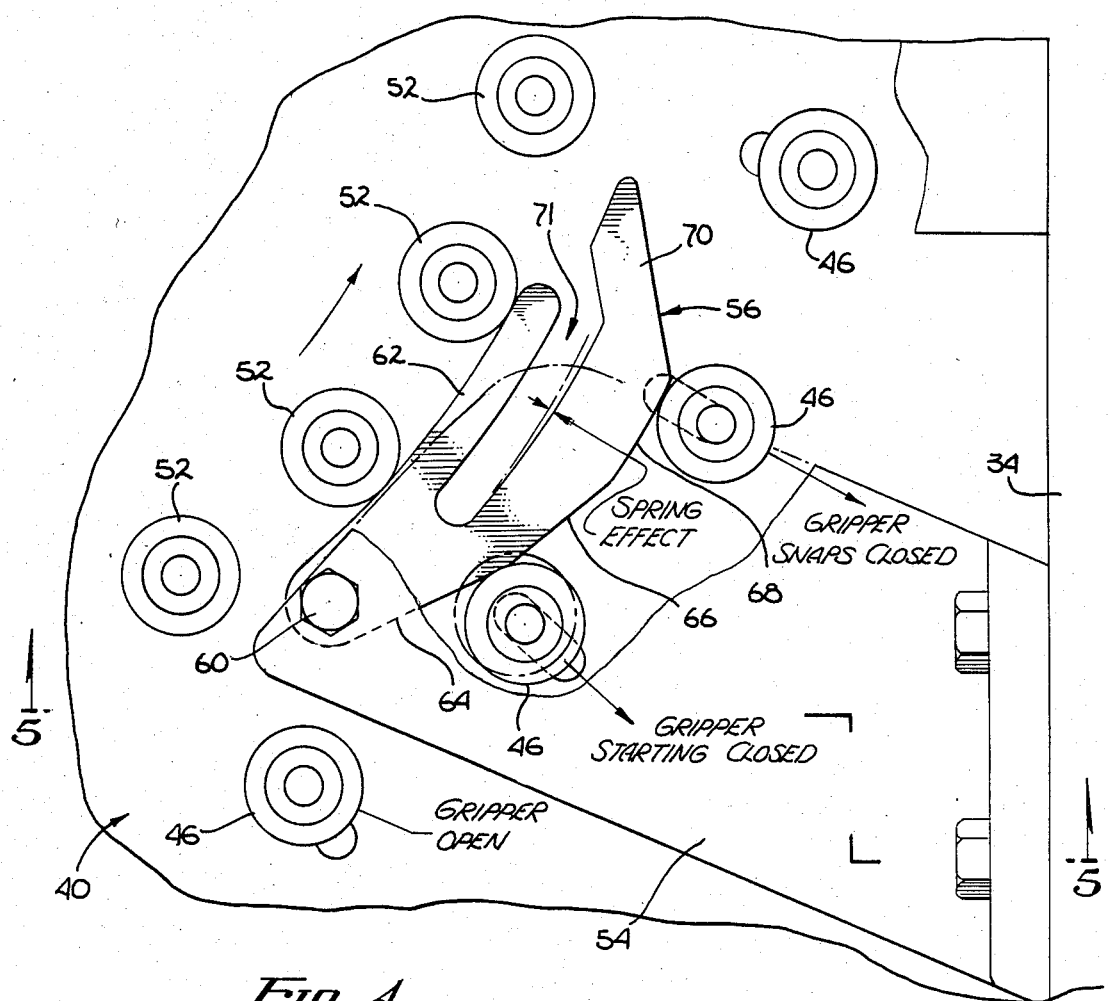
FIG. 4 is a view, similar to FIG. 3, of the floating cam taken on an expanded scale.
Figure 5:
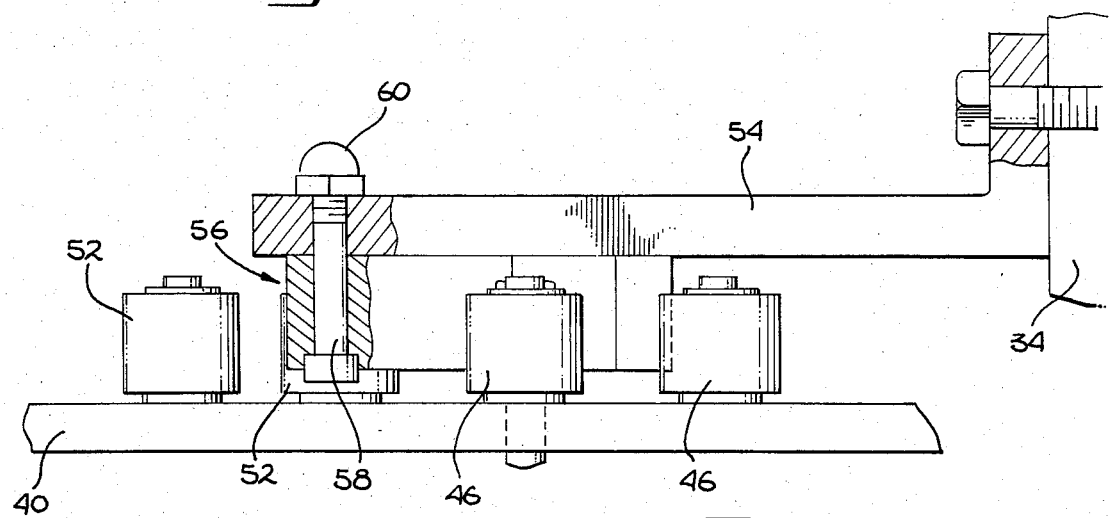
FIG. 5 is a view taken along line 5—5 of FIG. 4.

Now referring to FIGS. 3, 4 and 5, various aspects of the present invention may be seen. In particular, it will be noted that in addition to rollers 46 serving as the actuating members of the gripper assemblies, additional rollers 52 are provided, each associated with one of rollers 46 and being generally disposed radially inward with respect thereto on the upper starwheel 40. Rollers 52 are mounted on pins rigidly coupled to the upper starwheel 40 so as to always be fixed in position with respect thereto.

Mounted to the back of the inspection head 34 is a support bracket 54 which supports a floating cam-like member therebelow, generally indicated by the numeral 56, which is equivalent to cam 48 in FIG. 2. As can be seen in FIG. 5, the cam-like member is supported by screw 58 threaded into support bracket 54 and locked with respect thereto by a cap 60. The cam-like member is free to pivot on the shaft of the screw 58 in response to forces thereon, more specifically in response to the force exerted thereon by the various rollers in contact therewith.

As shown in FIG. 4, the cam-like member 56 has an inner curved surface 62 substantially equal in radius to the radius of the upper starwheel 40 taken over the outer diameter of rollers 52. Accordingly, for the proportions shown, at least one of rollers 52 will be disposed to contact the surface 62 to prevent the rotation of the cam about the supporting screw 58 in response to forces on the opposite side of the cam caused by the engagement of rollers 46 therewith. The opposite side of cam-like member 56 is characterized by a first sloped region 64, having a substantial slope with respect to rollers 46, a second sloped region 66 of a lesser incline, and a third region 68 comprising part of the arc of a circle having a center at the center of the starwheel. Finally, a trailing edge region 70 of substantial incline is provided. The incline surfaces 64 and 66 engage rollers 46 and by reacting against rollers 52, provide a cam-like action against rollers 46 to force the grippers to the bottle gripping condition. The actuating force is provided by rollers 52 mounted to the same structure as the gripper actuating rollers 46, i.e., the upper starwheel 40, so that the actuating forces are balanced out on that one structure, as opposed to being transmitted through various structures of substantial size as in the prior art equipment. Thus, the only force on support bracket 54 and through the structure of the inspection head is a slight drag on the cam-like member 56 as a result of the rollers acting thereon, whereas in the prior art equipment, the full actuation force of the grippers was exerted directly against the cam, 48 in FIG. 2, supported by the inspection head.

Region 66 of the cam-like member 56 assures that the actuation roller 46 of each gripper assembly is forced fully outward to the gripper actuated condition. However, in the preferred embodiment, region 68 is provided to assure proper operation of the cam-like member, even in the presence of some wear of the junction between regions 66 and 68. Further, it should be noted that in order to allow for the accumulation of tolerances, the cam-like member 56 is provided with an open or throat-like region 71 which provides some flexibility in the cam-like member 56, allowing the member to elastically flex in the event a gripper does not want to close all the way or some other cause of interference exists. In that regard, good wear characteristics, adequate flexibility and low noise have resulted by using a cam-like member fabricated from Delrin.

Normally, equipment such as electronic bottle inspectors is operated in the forward direction only, though on occasion, during set up and/or trouble shooting of the equipment, the equipment may be manually operated in the reverse direction. It will be noted from FIG. 4 that the cam-like member 56 is supported and proportioned in such a way as to allow rotation of the starwheel assembly in a reverse direction without any jamming or interference caused by the cam-like member.

Figure 6:
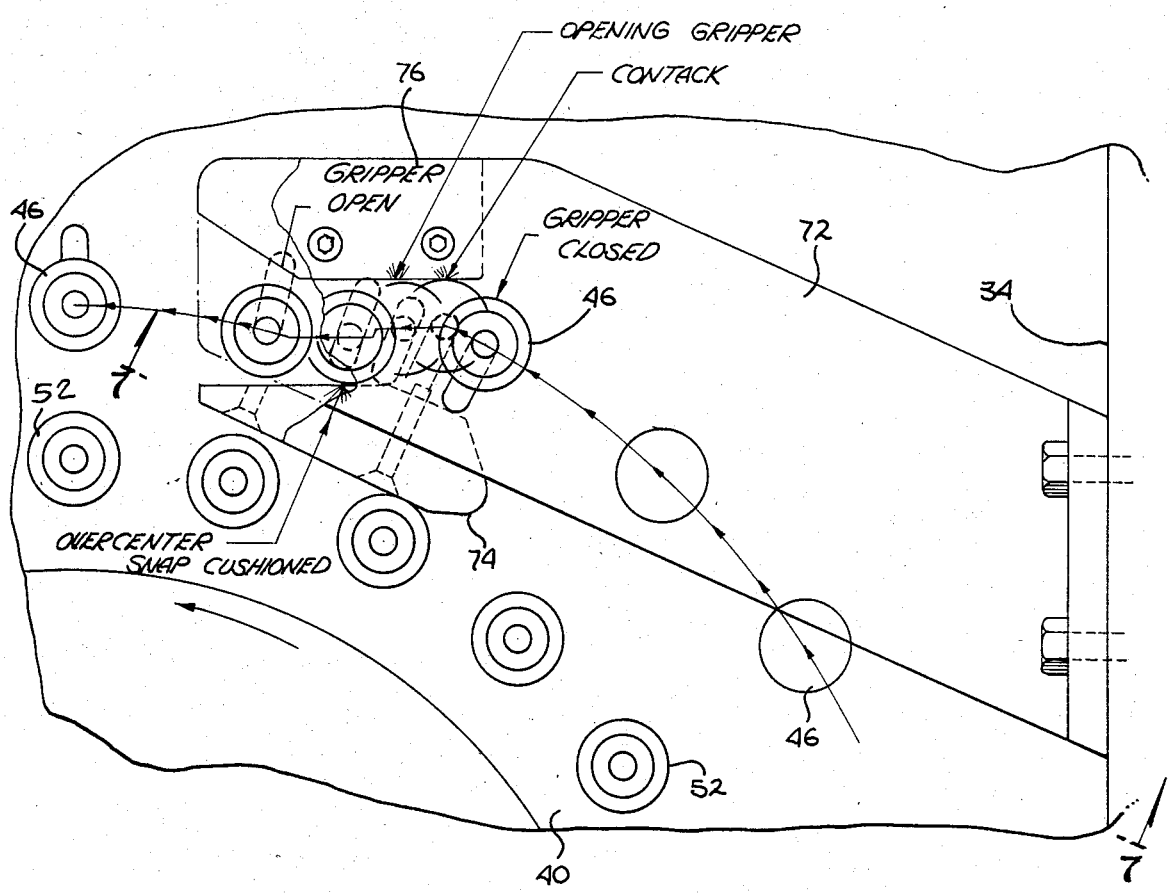
FIGS. 6 and 7 are views illustrating the gripper release cams of the system of FIG. 1.
Figure 7:
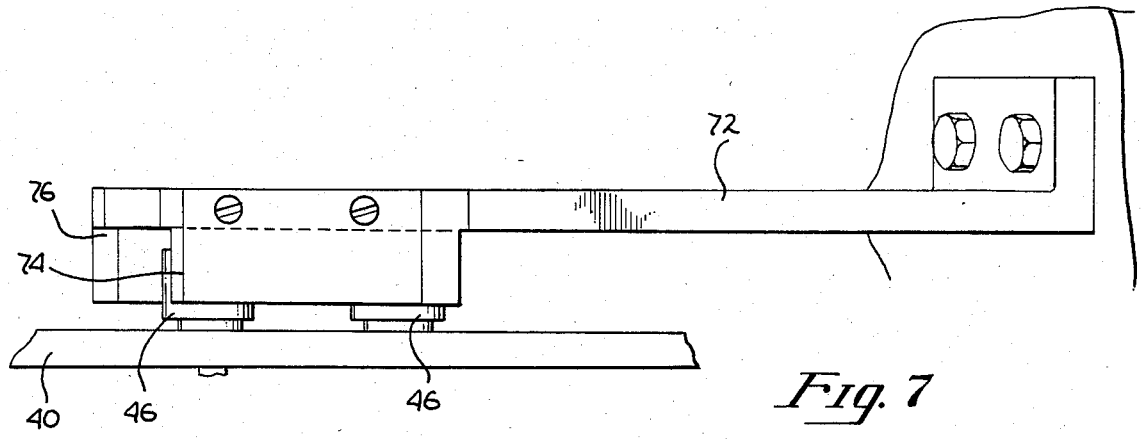

Now referring to FIGS. 3, 6 and 7, the cam assembly equivalent to the cam 51 of FIG. 2 for opening the grippers may be seen. This cam assembly is supported from the inspection head structure 34 on a bracket 72, also visible in FIG. 1. Supported below bracket 72 are first and second cam members 74 and 76. As is illustrated in FIG. 6, cam member 76 is disposed at a radius to intercept the gripper assembly actuating members 46 for those grippers which remain closed and to encourage rollers 46 toward a radially inward or gripper released position. When the over center mechanism of each gripper passes through center, the gripper snaps toward the open position, with the actuating roller 46 thereof snapping toward the radially inward extreme of its motion. However, in the embodiment of FIGS. 6 and 7, cam 74 intercepts the rollers 46 before they have substantial velocity and more gently lets the rollers 46 move to the gripper released position. The net result is a substantial reduction of the noise of the release mechanism, even when cam member 74 is fabricated from a relatively rigid material such as Delrin, though even greater reduction in noise may result from the use of a more flexible urethane or similar material. Cam 74, of course (as well as cam 76), are shaped so as to allow rotation of the starwheel assembly in the opposite direction, with cam 74 being further shaped to receive and only temporarily deflect a roller 46 of a gripper assembly which had already been released as a result of the rejection of the bottle held thereby.

There has been described herein a new and unique system for actuating mechanically actuated grippers so that substantially all of the actuating force is contained within the structure carrying the gripper as opposed to being transmitted through a circuitous path between a gripper mounted on one assembly or structure and a cam, roller or other apparatus for actuating the gripper mounted on another structure. The net result is a great reduction in vibration and noise in such systems, and a more positive gripper actuation as a result of the lack of accumulation of tolerances and deflections of miscellaneous structure in the system. Of course, while the present invention has been disclosed and described with respect to the preferred embodiment thereof, it will be understood by those skilled in the art that various changes in form and detail may be made therein without departing from the spirit and scope of the invention.

I claim:

1. A container conveying apparatus, comprising:
   starwheel assembly means, having a stationary frame assembly, and having a starwheel assembly rotatably mounted on said frame assembly comprising a pair of spaced substantially circular rotatable disks, each having a plurality of recesses on the periphery thereof, said recesses in each of said disks being aligned whereby containers may be held in said recesses,
   gripper assembly means mounted on said starwheeL assembly having gripper means for gripping and releasing the containers, and a first plurality of actuating members having a first and a second position, said first position being substantially radially outward of said second position, corresponding to the gripping and releasing of said gripper means, respectively, and a second plurality of actuating members associated with each of said first plurality of actuating members and being fixedly disposed radially inwardly with respect to said first plurality of actuating members on said starwheel means,
   actuator means pivotally supported on said stationary frame assembly and extending between successive ones of said first and second actuating members upon rotation of said starwheel assembly,
   whereby, upon rotation of said starwheel assembly, the actuating force provided by said second plurality of actuating members against said actuator means forces said actuator means to encourage said first plurality of actuating members to said first position causing said gripper means to grip a container.

2. The apparatus of claim 1, further comprising cam assembly means supported on said stationary frame adjacent said starwheel assembly having first and second cam means for intercepting said first plurality of actuating members to gently cause said first plurality of actuating members to said second position, whereby said gripping means releases the container.

3. The apparatus of claim 1 wherein said actuator means is a cam-like member having inner and outer curved surfaces.

4. The apparatus of claim 3 wherein said cam-like member has an open throat-like region between said inner and outer curved surfaces to provide flexibility in the event that said gripper means does not grip.

5. The apparatus of claim 1 wherein said first and second plurality of actuating members respectively comprise a first and second plurality of rollers.

6. A container-conveying apparatus, having a rotating starwheel assembly comprising a pair of spaced substantially circular rotatable disks, each having a plurality of recesses on the periphery thereof, said recesses in each of said disks being aligned whereby containers may be held in said recesses, comprising;
   gripper assembly means having gripper means for gripping and releasing containers in response to the position of said first actuating means,
   second actuating means fixedly mounted on said starwheel assembly radially inward from said first actuating means and corresponding with said first actuating means,
   actuator means stationarily pivotedly supported adjacent said starwheel assembly for responding to engagement with said first actuating means of said gripper means by engaging said second actuating means such that an actuation force is provided by said second actuating means through said actuator means to said first actuating means for causing said gripper means to grip containers as said disks rotate.

7. The apparatus of claim 6, further comprising;
   cam assembly means supported on the starwheel assembly and having first and second cam means for intercepting said first actuating means whereby said gripper means releases the container.

8. The apparatus of claim 6 wherein said actuator means comprises a cam-like member having an inner curved surface substantially equal in radius to the radius of said starwheel assembly taken over the outer diameter of said second actuating means, and having an outer curved surface having a first sloped region, a second sloped region of lesser incline than said first sloped region, and a third region,
   such that the first sloped region and the second sloped region of the outer curved surface of the cam-like member engage the first actuating means when said inner curved surface reacts against the second actuating means to provide a cam-like action whereby said first actuating means causes the gripper means to grip the container.

9. The apparatus of claim 6 wherein said first and second actuating means respectively comprise a first and second plurality of rollers.

10. The apparatus of claim 6 wherein said actuator means and said first and second cam means allow forward and backward operation of the apparatus.

* * * * *